United States Patent
Ward, Jr. et al.

(10) Patent No.: US 10,163,152 B1
(45) Date of Patent: Dec. 25, 2018

(54) NOTIFICATION OF COMPUTING CAPACITY STATUS

(71) Applicant: Amazon Technologies, Inc., Reno, NV (US)

(72) Inventors: David John Ward, Jr., Seattle, WA (US); Jin Seop Kim, Seattle, WA (US); Stephen Alden Elliott, Seattle, WA (US); Rusenia Carpio Ingram, Seattle, WA (US); Rachid Ennaji, Seattle, WA (US); Brian Helfrich, Seattle, WA (US); Dhanvi Harsha Kapila, Redmond, WA (US); Peng Zhai, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 977 days.

(21) Appl. No.: 13/829,661

(22) Filed: Mar. 14, 2013

(51) Int. Cl.
*G06Q 40/00* (2012.01)

(52) U.S. Cl.
CPC .................................... *G06Q 40/00* (2013.01)

(58) Field of Classification Search
CPC ............... G06Q 30/0601; G06Q 30/04; G06Q 30/0641; H04L 67/306; H04L 67/20
See application file for complete search history.

(56) References Cited

U.S. PATENT DOCUMENTS

| | | | | |
|---|---|---|---|---|
| 6,779,030 B1* | 8/2004 | Dugan | ............... | H04M 3/42136 379/221.08 |
| 6,898,609 B2* | 5/2005 | Kerwin | ............... | G06F 17/3056 707/634 |
| 7,133,842 B2* | 11/2006 | Harif | ...................... | G06Q 30/02 705/37 |
| 7,574,523 B2* | 8/2009 | Traversat | .............. | G06F 9/4416 709/227 |
| 8,566,838 B2* | 10/2013 | Sabin | .................... | G06F 9/5072 709/222 |
| 8,676,622 B1* | 3/2014 | Ward, Jr. | ......... | G06Q 10/06313 705/7.11 |
| 9,098,562 B2* | 8/2015 | Bettger | ............. | G06F 17/30587 |
| 9,202,225 B2* | 12/2015 | Ferris | ...................... | G06F 11/34 |
| 9,304,663 B1* | 4/2016 | Guo | ....................... | G06F 3/0484 |

(Continued)

OTHER PUBLICATIONS

Anderson, Wayne (Spot Instance Billing, https://forums.aws.amazon.com/message.jspa?messageID=213375, Dec 29, 2010).*

(Continued)

*Primary Examiner* — Abhishek Vyas
*Assistant Examiner* — Mark H Gaw
(74) *Attorney, Agent, or Firm* — Baker & Hostetler LLP

(57) ABSTRACT

One or more computing instances are instantiated and allocated to customers. The computing instances have a modifiable interruptibility property that is operable to allow a computing instance to be terminated or reallocated from a first customer to a second customer. Requests for additional computing instances having modifiable interruptibility properties are received. Information pertaining to the instantiated computing instances and requested additional computing instances is provided. The information may include a current status of the instantiated computing instances or requested additional computing resources.

23 Claims, 9 Drawing Sheets

(56) References Cited

U.S. PATENT DOCUMENTS

| | | | | |
|---|---|---|---|---|
| 2001/0056522 A1* | 12/2001 | Satyanarayana | ...... | G06F 12/023 |
| | | | | 711/170 |
| 2006/0020525 A1* | 1/2006 | Borelli | ......... | G06Q 30/04 |
| | | | | 705/34 |
| 2010/0107158 A1* | 4/2010 | Chen | ......... | G06F 11/1438 |
| | | | | 718/1 |
| 2010/0306354 A1* | 12/2010 | DeHaan | ......... | G06F 1/3203 |
| | | | | 709/222 |
| 2013/0179289 A1* | 7/2013 | Calder | ......... | G06Q 30/08 |
| | | | | 705/26.3 |

OTHER PUBLICATIONS

Dave@AWS (Spot Instance Billing, https://forums.aws.amazon.com/message.jspa?messageID=213375, Dec 22, 2010).*

B. Sotomayor, R. Montero, I. Llorente, I. FosterVirtual infrastructure management in private and hybrid cloudsIEEE Internet Computing, 13 (2009) (Year: 2009).*

A standards-based grid resource brokering service supporting advance reservations, coallocation and cross-grid interoperabilityConcurrency and Computation: Practice and Experience, 21 (2009) (Year: 2009).*

B. Sotomayor, K. Keahey, I. Foster, "Combining Batch Execution and Leasing using Virtual Machines", Proc. 17th Int'l Symp. High Performance Distributed Computing (HPDC 08), 2008 (Year: 2008).*

B. Sotomayor, "Enabling Cost-Effective Resource Leases with Virtual Machines", Hot Topics Session in ACM/IEEE Int'l Symp. High-Performance Distributed Computing 2007 (HPDC 07), 2007 (Year: 2007).*

* cited by examiner

NOTIFICATION OF COMPUTING CAPACITY STATUS

BACKGROUND

A data center is a facility that houses computer systems and various networking, storage and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner.

Some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage and/or other network-accessible functionality allow customers to reserve or purchase access to resources in any of several different resource acquisition modes. For example, a customer may reserve a virtual resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Embodiments of systems and methods are described for providing, by a provider network, such as a data center, computing resources such as virtual instances based on dynamically varying pricing for the computing resources. For example, a virtual instance requested by a customer of the data center may be associated with a price that the customer may wish to pay for the virtual instance. The actual price charged by the data center for the computing resource may vary based on factors such as current market demand for the computing resource and the amount of excess computing capacity available for variably priced computing resources. The computing resource may be provided to the customer during periods of time in which the actual price for the computing resource is commensurate with the price that the customer desires to pay. During periods of time in which the actual price for the computing resource exceeds the price that the customer wishes to pay, the computing resource may be reallocated to another customer who is willing to pay the actual price.

In various embodiments, the status of a pending request for such a variably priced computing resource, or the status of a variably priced computing resource already allocated to a customer, may be provided. For example, the customer may be provided with a message notification that a requested variably priced computing resource will be available, or that a computing resource currently provided to the customer will no longer be available. Additionally, the customer may take an action in response to the notification. For example, if a current computing resource will no longer be available, the customer may modify the paid price so that the customer can continue use of the computing resource. The customer may also take actions to save data for applications running on the computing resource before the resource is no longer available. Alternatively, workflows running on the computing resource may be redistributed to other computing resources to avoid interruptions to the services provided by the workflows.

Figure 1:
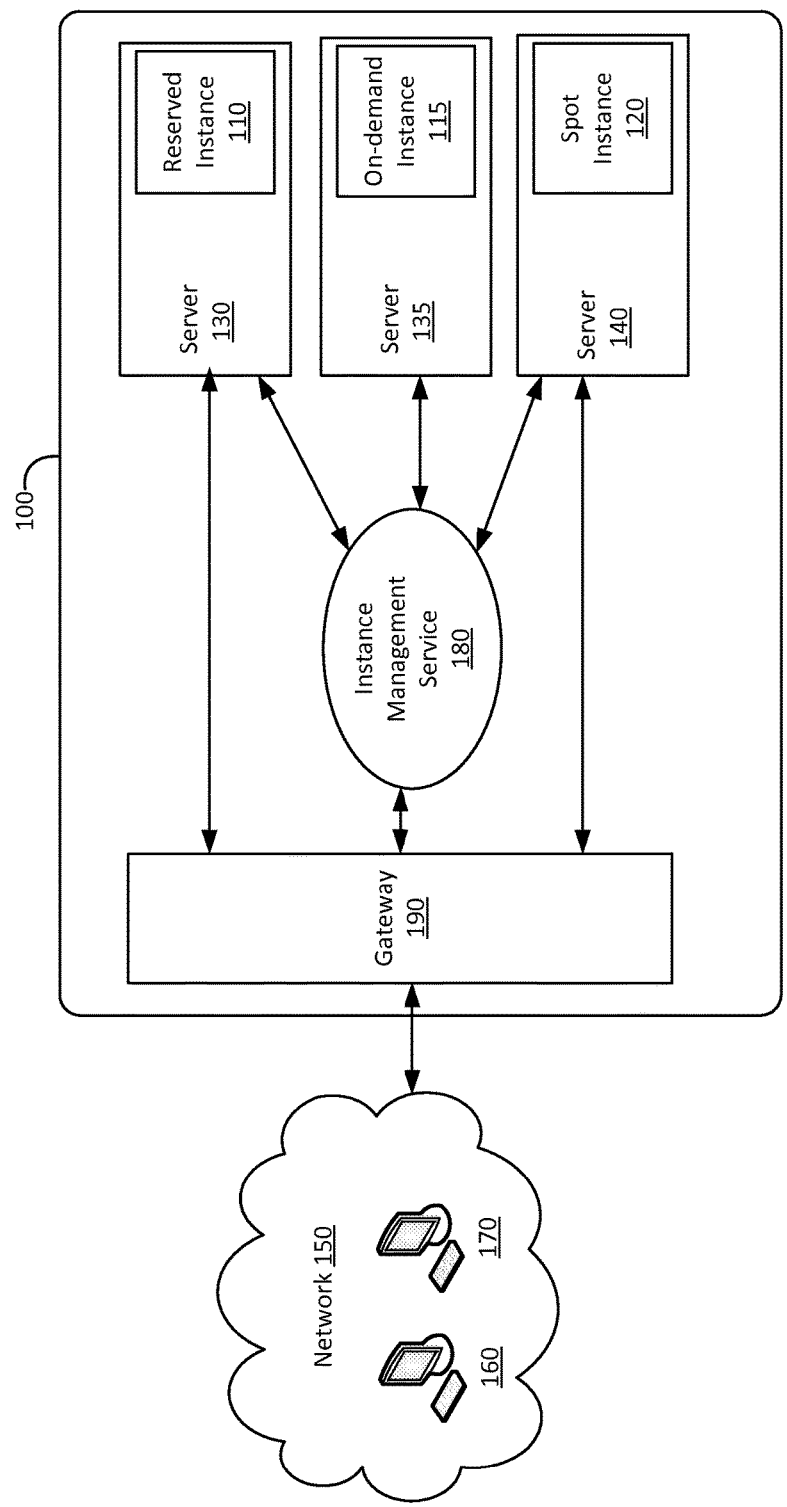
FIG. 1 is a diagram illustrating a mechanism for providing status notifications in accordance with the present disclosure.

FIG. 1 is a diagram illustrating a system 100 including a mechanism for providing notifications in accordance with the present disclosure. In FIG. 1, system 100 may include a reserved virtual machine instance 110, an on-demand virtual machine instance 115 and a spot virtual machine instance 120 that may execute, for example, on one or more server computers 130, 135 and 140, respectively. In one embodiment, a spot virtual machine instance, or a spot instance, may refer to an allocation of a virtual machine instance using a spot-price mode, where a customer may specify the maximum price per unit time that the customer is willing to pay for the instance. If the customer's maximum price exceeds a dynamic spot price determined at least in part by supply and demand, then the instance may be provided to the customer. It will be appreciated that some embodiments may involve additional virtual machine instances of various types that may be instantiated on additional server computers.

FIG. 1 also illustrates public network 150 that may include one or more computers such as computers 160 and 170. According to one embodiment, instances 110, 115 and 120 may be configured to provide computing services to a computer user (not shown) of public network 150 via gateway 190 and computers 160 and 170. For example, reserved virtual machine instance 110 may provide a set of remote access enterprise applications to a group of users who may, for example, be employees of an enterprise customer.

A user at computer 160 or 170 may send a request to an instance management service 180 for a new spot instance. In some embodiments, server 130 or 140 may send the request, on behalf of a user, on behalf of itself or on behalf of other servers. In response to the request for the spot instance, instance management service 180 may log the request and periodically provide updates as to the status of the request. Instance management service 180 may also periodically provide updates as to the status of one or more of instances 110, 115 and 120.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity such as a company or organization to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor or another type of program configured to enable the execution of multiple instances).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 2:
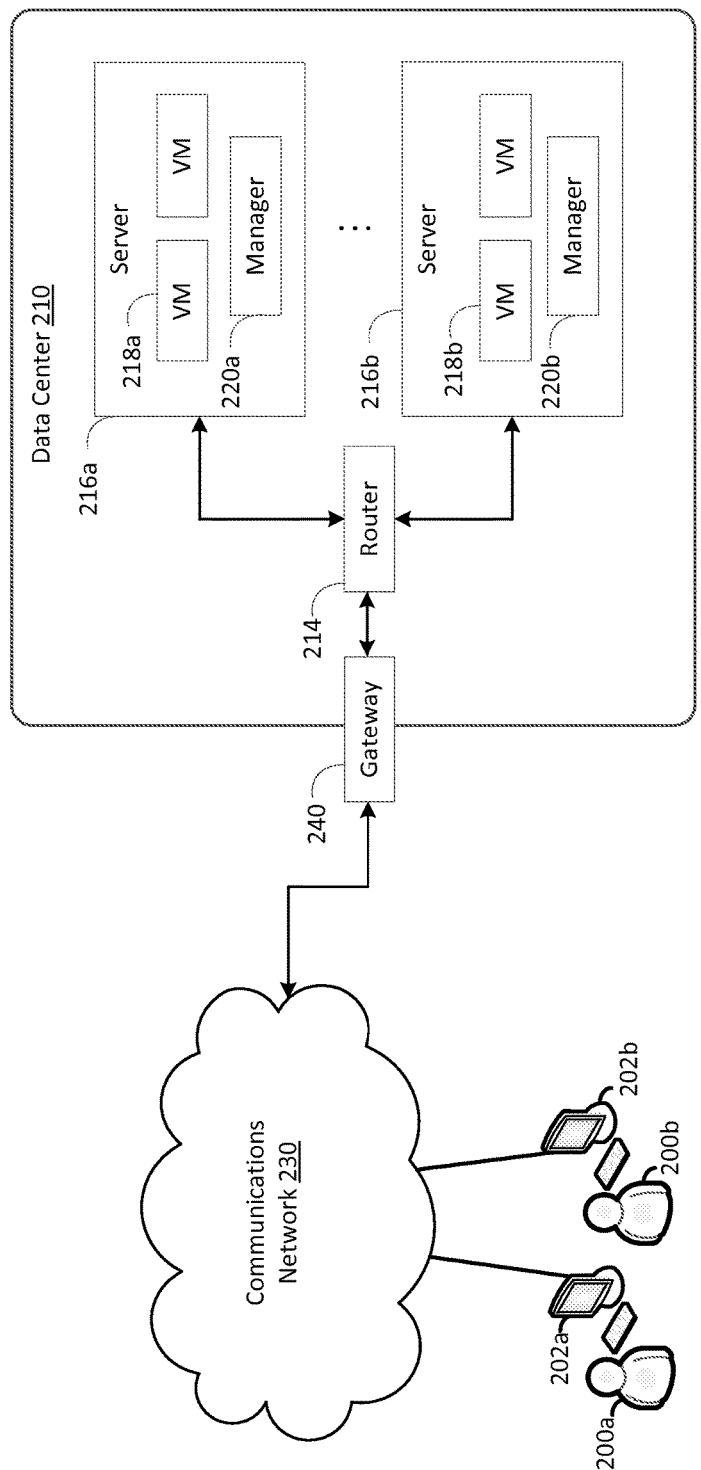
FIG. 2 is a diagram illustrating an example computing system that may be used in some embodiments.

FIG. 2 illustrates an example computing environment in which the embodiments described herein may be implemented. FIG. 2 is a diagram schematically illustrating an example of a data center 210 that can provide computing resources to users 200*a* and 200*b* (which may be referred herein singularly as "a user 200" or in the plural as "the users 200") via user computers 202*a* and 202*b* (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 210 may include servers 216 that provide computing resources available as virtual machine instances 218*a* and 218*b* (which may be referred herein singularly as "a virtual machine instance 218" or in the plural as "the virtual machine instances 218"). The virtual machine instances 218 may be configured to execute applications, including Web servers, application servers, media servers, database servers and the like. Other resources that may be provided include data storage resources (not shown) and may include file storage devices, block storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. Computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

Computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b (which may be referred herein singularly as "a server 216" or in the plural as "the servers 216") shown in FIG. 2 may be standard servers configured appropriately for providing the computing resources described above and may provide computing resources for executing one or more applications. In one embodiment, the computing resources may be virtual machine instances 218.

In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240 which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared and other types of information. The deployment component utilizes the customer-provided configuration and cache warming logic to launch, configure and prime new instances of computing resources.

Figure 3:
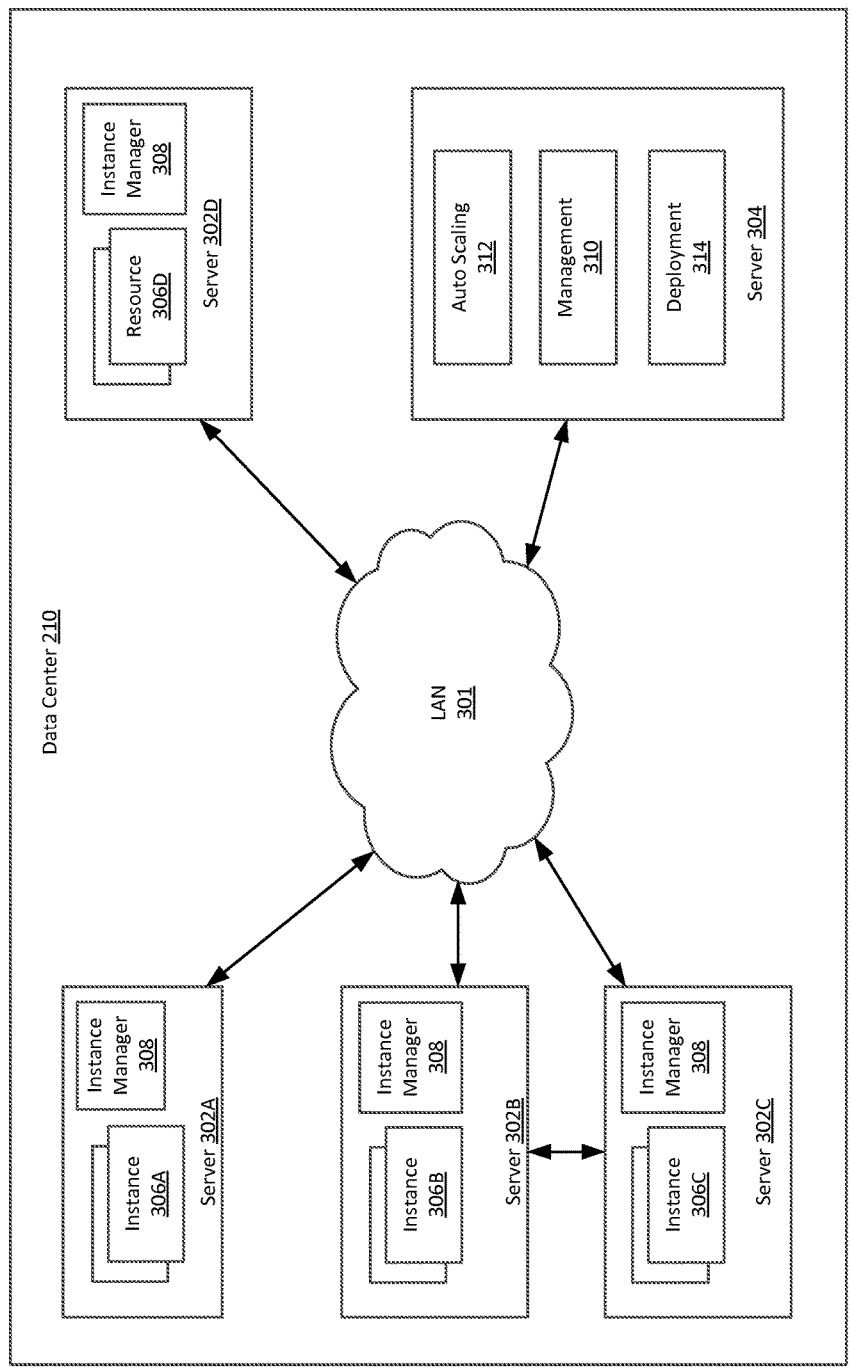
FIG. 3 is a diagram illustrating an example computing system that may be used in some embodiments.

FIG. 3 is a computing system diagram that illustrates one configuration for a data center 210 configured to launch virtual machine instances. The example data center 210 shown in FIG. 3 includes several server computers 302A-302D (which may be referred herein singularly as "a server computer 302" or in the plural as "the server computers 302") for providing computing resources for executing an application. The server computers 302 may be standard tower or rack-mount server computers configured appropriately for providing the computing resources described above. For instance, in one implementation the server computers 302 are configured to provide instances 306A-306D of computing resources.

In one embodiment, the instances 306A-306D (which may be referred herein singularly as "an instance 306" or in the plural as "the instances 306") are virtual machine instances. As known in the art, a virtual machine instance is an instance of a software implementation of a machine (i.e., a computer) that executes programs like a physical machine. In the example of virtual machine instances, each of the servers 302 may be configured to execute an instance manager 308 capable of executing the instances. The instance manager 308 might be a hypervisor or another type of program configured to enable the execution of multiple instances 306 on a single server 302, for example. As discussed above, each of the instances 306 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources and with other types of resources. The embodiments disclosed herein might also execute all or a portion of an application directly on a computer system without utilizing virtual machine instances.

The data center 210 shown in FIG. 3 also includes a server computer 304 reserved for executing software components for managing the operation of the data center 210, the server computers 302 and the instances 306. In particular, the server computer 304 might execute a management component 310. As discussed above, a customer of data center 210 might utilize a customer computing system to access the management component 310 to configure various aspects of the operation of data center 210 and the instances 306 purchased by the customer. For example, the customer may purchase instances and make changes to the configuration of the instances. The customer might also specify settings regarding how the purchased instances are to be scaled in response to demand. The customer might also provide requests to launch instances to the management component 310.

As also described briefly above, an auto scaling component 312 scales the instances 306 based upon rules defined by a customer of data center 210. In one embodiment, for instance, the auto scaling component 312 allows a customer to specify scale up rules for use in determining when new instances should be instantiated and scale down rules for use in determining when existing instances should be terminated.

The auto scaling component 312 may execute on a single server computer 304 or in parallel across multiple server computers 302 in data center 210. In addition, the auto scaling component 312 may consist of a number of subcomponents executing on different server computers 302 or other computing devices in data center 210. The auto scaling component 312 may be implemented as software, hardware or any combination of the two. The auto scaling component 312 may monitor available computing resources in data center 210 over an internal management network, for example.

As discussed briefly above, data center 210 may also be configured with a deployment component 314 to assist customers in the deployment of new instances 306 of computing resources. The deployment component 314 may receive a configuration from a customer that includes data describing how new instances 306 should be configured. For example, the configuration might specify one or more applications that should be installed in new instances 306, provide scripts and/or other types of code to be executed for configuring new instances 306, provide cache warming logic specifying how an application cache should be prepared and other types of information.

The deployment component 314 utilizes the customer-provided configuration and cache warming logic to configure, prime and launch new instances 306. The configuration, cache warming logic and other information may be specified by a customer using the management component 310 or by providing this information directly to deployment component 314. Other mechanisms might also be utilized to configure the operation of deployment component 314.

In the example data center 210 shown in FIG. 3, an appropriate local area network (LAN) 301 is utilized to interconnect the server computers 302A-302D and the server computer 304. The LAN 301 is also connected to communications network 230 illustrated in FIG. 2. It should be appreciated that the network topology illustrated in FIGS. 2 and 3 has been greatly simplified and that many more networks and networking devices may be utilized to interconnect the various computing systems disclosed herein. Appropriate load balancing devices or software modules might also be utilized for balancing a load between data center 210 and other data centers (not shown), between each of the server computers 302A-302D in data center 210 and between instances 306 purchased by each customer of data center 210. These network topologies and devices should be apparent to those skilled in the art.

It should be appreciated that data center 210 described in FIG. 3 is merely illustrative and that other implementations might be utilized. In particular, functionality described herein as being performed by the management component 310, the auto scaling component 312 and the deployment component 314 might be performed by one another, might be performed by other components or might be performed by a combination of these or other components. Additionally, it should be appreciated that this functionality might be implemented in software, hardware or a combination of software and hardware. Other implementations should be apparent to those skilled in the art.

Operators of provider networks such as those described above may, in some embodiments, implement a flexible set of resource reservation, control and access interfaces for their clients. For example, a resource manager of the provider network may implement a programmatic resource reservation interface (e.g., via a Web site or a set of Web pages) that allows clients to learn about, select, purchase access to and/or reserve resource instances. In some of the various embodiments discussed below, where an entity such as a resource manager is described as implementing one or more programmatic interfaces such as a Web page or an application programming interface (API), an interface manager subcomponent of that entity may be responsible for the interface-related functionality. In some embodiments, equivalent interface-related functionality may be implemented by a separate or standalone interface manager, external to the resource manager. Such an interface may include functionality to allow browsing of a resource catalog, provide details and specifications of the different types or sizes of resources supported, the different reservation types or modes supported, pricing models and so on.

In some embodiments, the provider network may support several different purchasing modes (which may also be referred to herein as reservation modes) such as long-term reservations, on-demand resource allocation or spot-price-based resource allocation. Using the long-term reservation mode, a client may make, for example, a low, one-time, upfront payment for a resource instance, reserve the resource instance for a specified duration such as a one- or three-year term, and pay a low hourly rate for the instance. In this case, the client may be assured of access to the reserved instance for the full term of the reservation.

Using on-demand mode, a client may pay for capacity by the hour (or some other appropriate time unit), without any long-term commitments or upfront payments. When using an instance obtained in on-demand mode, the client may be allowed to extend the allocation period as needed, and thus maintain client access to the instance until the client voluntarily relinquishes access (e.g., by terminating the instance). Similarly, in the case of a long-term reserved instance, a client may have uninterrupted access to the instance for the term of the reservation, and may at least in some embodiments renew the reservation to extend its access to the instance. Such instance allocations, in which the client controls how long it accesses a resource instance and when the instance is terminated, may be termed "uninterruptable" instance allocations, and the corresponding instances may be referred to as uninterruptible instances.

In contrast, some pricing modes may be associated with interruptible instance allocations. In the spot-price mode, a client may specify the maximum price per unit time that the client is willing to pay for a particular type of resource. If the client's maximum price exceeds a dynamic spot price determined at least in part by supply and demand, that type of resource may be provided to the client. In this case, the dynamic price spot price may be referred to as a market-based price or price level. In some embodiments, dynamically resizable pools of resource instances may be set aside for the different reservation types or modes—e.g., long-term reserved instances may be allocated from one pool, on-demand instances from another and so on. Such a computing resource may be referred to as an interruptible instance allocation, an interruptible instance, a spot instance or a computing resource with an interruptibility property.

During periods when the supply of the requested resource type exceeds the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone are insulated from failures in other availability zones. For example, a failure in one availability zone may not be expected to result in a failure in any other availability zone. Thus in some embodiments, the availability profile of a resource instance may be independent of the availability profile of a resource instance in a different availability zone. Clients may thus be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 4:
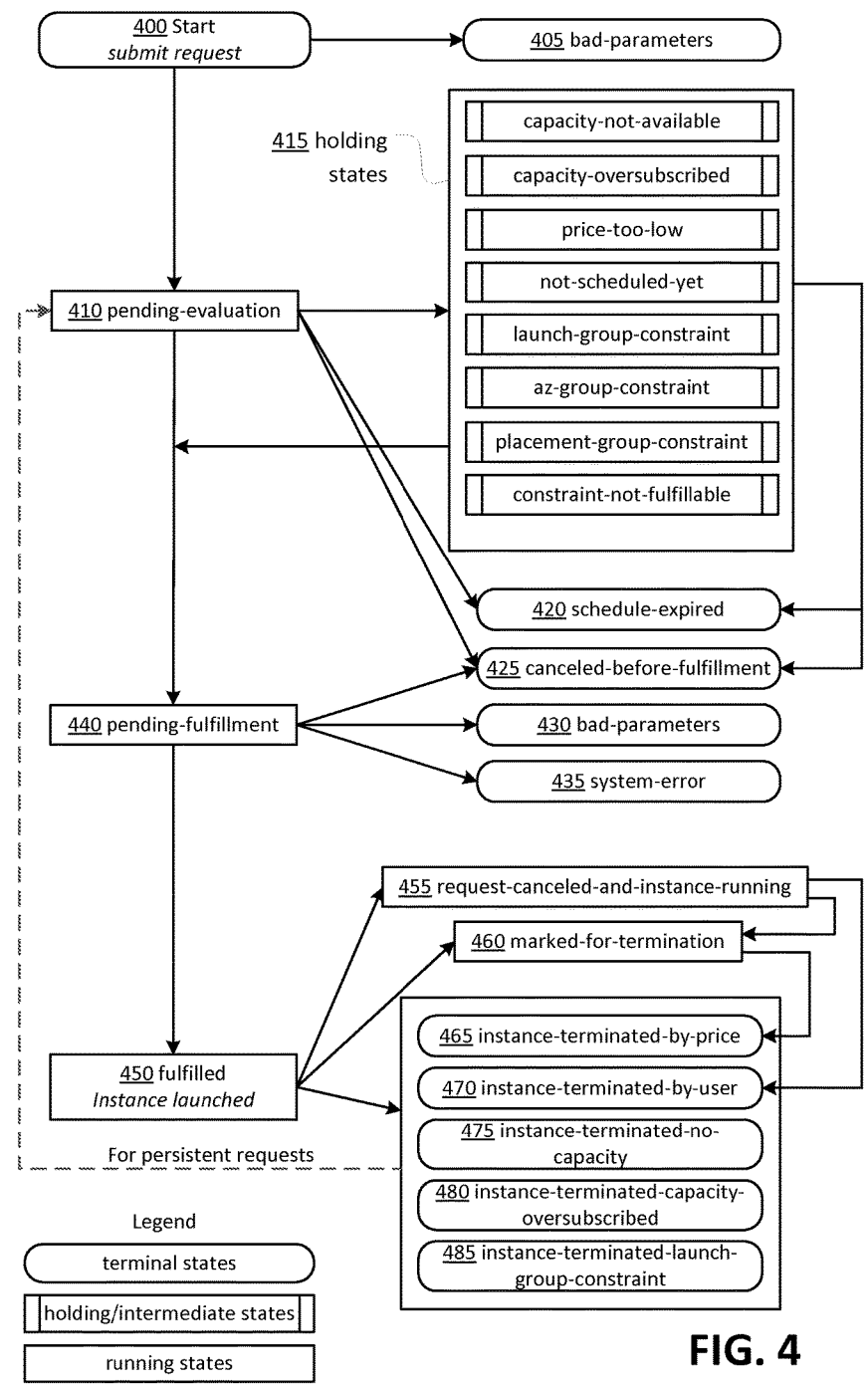
FIG. 4 is a diagram illustrating a mechanism for providing spot instances in accordance with the present disclosure.

Referring to FIG. 4, illustrated is an example embodiment describing one possible life cycle of a spot instance. A spot instance bid may have a life cycle with multiple states. A request, or bid, for a spot instance may begin, for example, with a submission of a request 400. Transitions between the states may occur as the request is reviewed, fulfilled and ultimately terminated. For example, if the submitted request contains incorrect information, the bid request may be statused as having bad-parameters 405. A valid request can be statused as pending-evaluation 410 during evaluation of the request and can further proceed through states such as one of a number of holding states 415. The request can also expire (schedule-expired) 420 if a time limit for the request expires, and the request can be canceled (canceled-before-fulfillment) 425. The request can also be statused as pending-fulfillment 440 if the request is approved and awaiting instantiation. The request can also proceed through states such as bad-parameters 430 or otherwise be subject to system-error 435, if any issues arise during fulfillment that prevent completion of the request. The request can be fulfilled 450 and can further proceed through states such as canceled (request-canceled-and-instance-running) 455, marked-for-termination 460, instance-terminated-by-price 465, instance-terminated-by-user 470, instance-terminated-no-capacity 475, instance-terminated-capacity-oversubscribed 480, or instance-terminated-launch-group-constraint 485.

Figure 5:
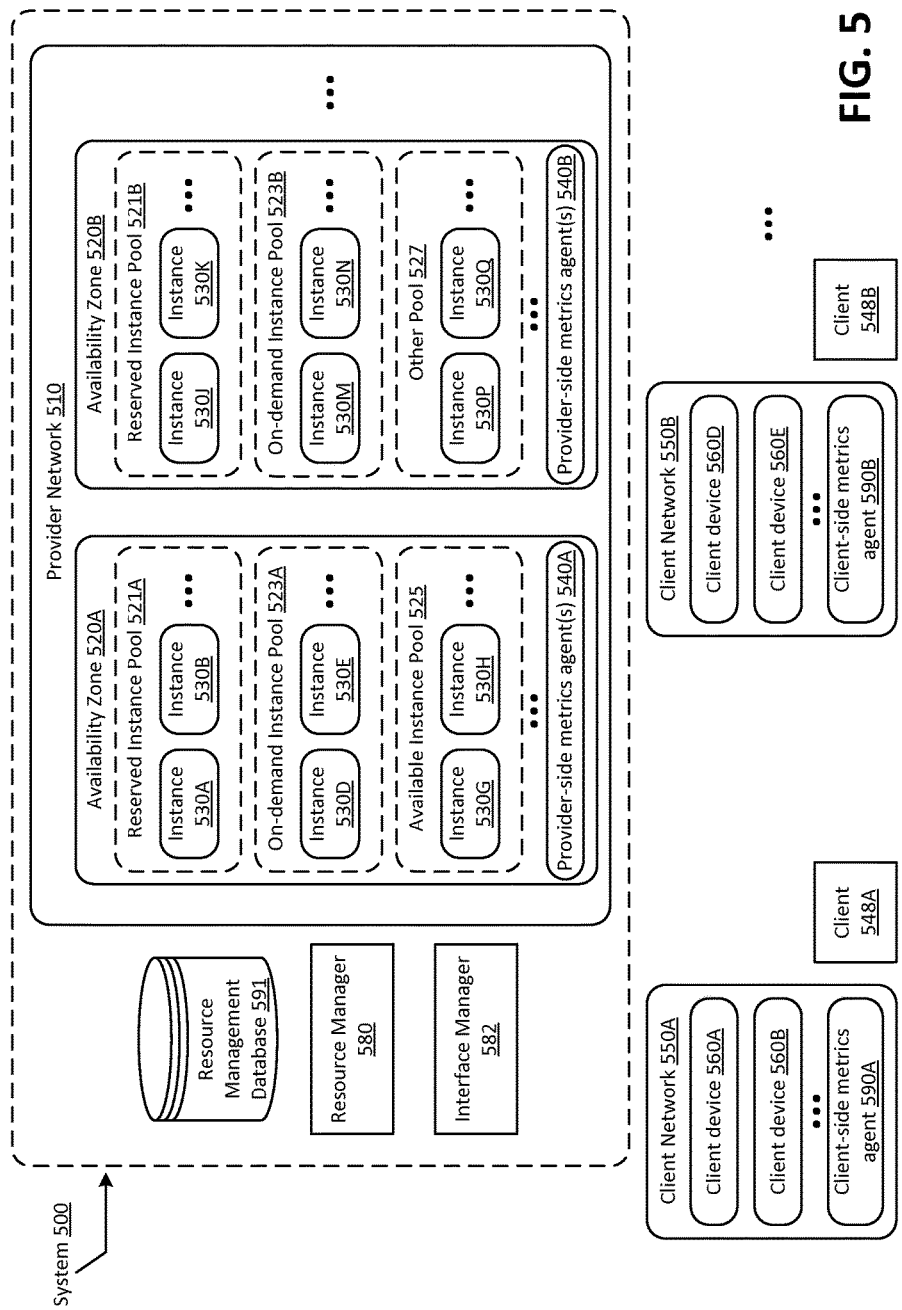
FIG. 5 is a diagram illustrating a mechanism for providing spot instances in accordance with the present disclosure.

FIG. 5 illustrates an example system environment for providing spot instances, according to at least some embodiments. The system 500 includes a provider network 510 comprising a plurality of resource instances 530 (which may be referred herein singularly as "a resource instance 530" or in the plural as "the resource instances 530"), such as instances 530A, 530B, 530D, 530E, 530G and 530H in one availability zone 520A, and instances 530J, 530K, 530M, 530N, 530P, 530Q in a different availability zone 520B. The various resource instances 530 in the availability zones 520A and 520B (which may be referred herein singularly as "an availability zone 520" or in the plural as "the availability zones 520") may be reserved and/or allocated for use by clients (or potential clients) such as client 548A and 548B (which may be referred herein singularly as "a client 548" or in the plural as "the clients 548"). In the illustrated embodiment, system 500 includes a resource manager 580 and an interface manager 582. As noted earlier, in some embodiments the functionality of the interface manager 582 may be implemented by a subcomponent of the resource manager 580. While FIG. 5 depicts separate resource pools, in some embodiments the instances may be allocated at the time of instantiation. For example, when there is a surge in demand for on-demand instances, capacity may be claimed from various pools to fill the demand.

The interface manager 582 may in some embodiments implement one or more programmatic interfaces allowing clients 548 to search for, browse, reserve and acquire instances 530 to obtain various types of services, e.g., to run and/or access various applications. In the illustrated embodiment, at a given point in time, some or all of the instances 530 may be assigned to instance pools (based in part on instance categorization approaches similar to those illustrated in FIGS. 6A and 6B), such as reserved instance pools 521A or 521B, on-demand instance pools 523A or 523B, available instance pool 525 or other pools such as other pool 527.

In some embodiments a given pool such as available instance pool 525 may itself contain its own sub-pools, e.g., based on the modes of instance reservation and allocation supported. Each pool (or sub-pool) may have an associated pricing policy for its instances, as well as other properties such as interruptibility settings for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 530 illustrated in FIG. 5 are shown as belonging to availability zones 520, in other embodiments the provider network 510 may be organized differently, e.g., in some embodiments availability zones 520 may not be implemented. Availability zones 520 may be grouped into geographic regions (not shown in FIG. 5) in some embodiments. Instance pools may be implemented within availability zones in some implementations (e.g., each availability zone may have its own reserved instance pool), while in other implementations an instance pool or sub-pool may span multiple availability zones.

Figure 6A:
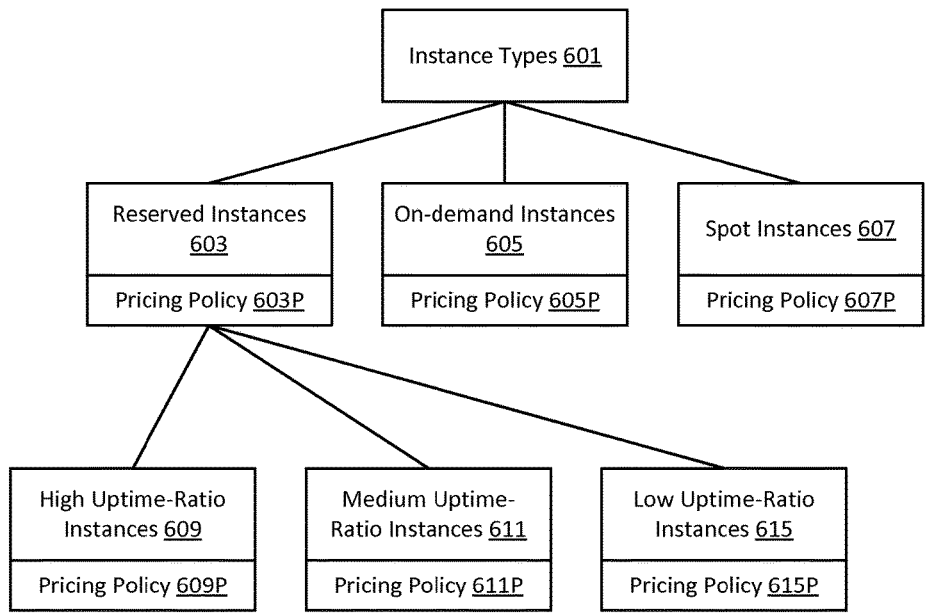
FIGS. 6A and 6B are diagrams illustrating mechanisms for providing spot instances in accordance with the present disclosure.
Figure 6B:
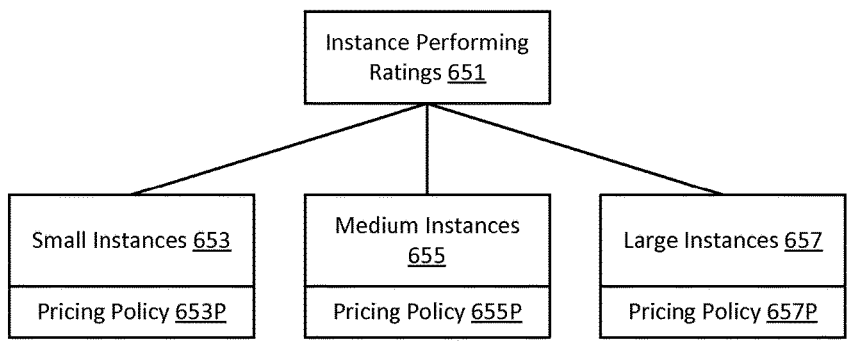

The resource instances 530 of a provider network may be grouped into classes or categories based on several different dimensions in some embodiments, and the pricing policies associated with different classes may differ. FIGS. 6A and 6B illustrate example resource instance classification approaches, according to at least some embodiments. FIG. 6A illustrates an approach in which instances are classified based in part on the timing or duration of instance allocations—i.e., on when instances are obtained by clients and when they are released by the clients. Three high-level types 601 of resource instances are shown: reserved instances 603, on-demand instances 605 and spot instances 607, each with respective pricing policies 603P, 605P and 607P. In one embodiment, a client 548 may reserve an instance for fairly long periods, such as a one-year term or a three-year term in accordance with the pricing policy 603P, by paying a low, one-time, upfront payment for the instance, and then paying a low hourly rate for actual use of the instance at any desired times during the term of the reservation. Thus, the client 548 may, by making the long-term reservation, be assured that his or her reserved instance 603 will be available whenever it is needed.

If a client 548 does not wish to make a long-term reservation, the client may instead opt to use on-demand instances 605 (or spot instances 607). The pricing policy 605P for on-demand instances 605 may allow the client 548 to pay for resource capacity by the hour with no long-term commitment or upfront payments. The client 548 may decrease or increase the resource capacity used, based on application needs, and may only have to pay the hourly rate for the instances used. In some cases the per-hour pricing for on-demand instances may be higher than the hourly rate for reserved instances, because the relatively long durations of reservations may provide a more stable revenue stream to the operator of the provider network than the potentially more dynamic revenue stream provided by on-demand instances. Spot instances 607 may provide a third type of resource purchasing and allocation model. The spot pricing policy 607P may allow a client 548 to specify the maximum hourly price that the client is willing to pay, and the resource manager 580 may set a spot price for a given set of resource instances 530 dynamically based on the prices clients are willing to pay and on the number of instances available to support the spot model. If a client 548's bid meets or exceeds the current spot price, an instance may be allocated to the client. If the spot price rises beyond the bid of the client using a spot instance 607, access to the instance by the client may be revoked (e.g., the instance may be shut down).

The prices of reserved instances 603, on-demand instances 605 and spot instances 607 may also vary based on the availability zones 520 or geographic regions in which the instances are located. The operator of provider network 510 may have had to pay different costs for setting up data centers in different physical locations and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. The price for a given long-term reservation may typically remain unchanged once a client completes the reservation.

In some embodiments, reserved instances 603 may be further classified based on expected uptime ratios. The uptime ratio of a particular reserved instance 603 may be defined as the ratio of the amount of time the instance is activated, to the total amount of time for which the instance is reserved. Uptime ratios may also be referred to as utilizations in some implementations. If a client 548 expects to use a reserved instance for a relatively small fraction of the time for which the instance is reserved (e.g., 30%-35% of a year-long reservation), the client may decide to reserve the instance as a Low Uptime-Ratio instance 615 and pay a discounted hourly usage fee in accordance with the associated pricing policy 615P. If the client 548 expects to have a steady-state workload that requires an instance to be up most of the time, the client may reserve a High Uptime-Ratio instance 609 and potentially pay an even lower hourly usage fee, although in some embodiments the hourly fee may be charged for the entire duration of the reservation, regardless of the actual number of hours of use, in accordance with pricing policy 609P.

An option for Medium Uptime-Ratio instances 611, with a corresponding pricing policy 611P, may be supported in some embodiments as well, where the upfront costs and the per-hour costs fall between the corresponding High Uptime-Ratio and Low Uptime-Ratio costs.

Instance pricing may also vary based on other factors. For example, in the case of computing instances, the performance capacities of different CPUs and other components of computer servers such as memory size may come into play. FIG. 6B shows an example classification of computing instances based on instance performance ratings 651. Large instances 657 may have more computing capacity than medium instances 655, which in turn may have more computing capacity than small instances 653. Accordingly, different pricing policies 657P, 655P and 653P may be implemented for the different sizes of instances. In some embodiments, software features such as operating systems, hypervisors, middleware stacks and the like may also be taken into account in determining the pricing policies associated with various instances. For both computing instances and storage instances, storage device characteristics such as total storage capacity, supported input/output (I/O) rates and the like may be used to develop pricing policies in some implementations. Pricing policies may also be determined by networking capabilities and networking usage (e.g., number of megabytes of data transferred and/or the distances over which network traffic is transmitted). Other classification dimensions and techniques, including extensions of the basic hierarchies shown in FIGS. 6A and 6B, may be implemented in other embodiments. The various pricing policies, including static and dynamic components of pricing, as well as location-dependent and location-independent components, may be used. Some or all of the pricing information may be stored in resource management database 591. In some embodiments, the resource instances of a provider network may be organized as pools based on, for example, which instances are currently being used as on-demand instances (e.g., pools 523A and 523B of FIG. 5), which instances are reserved (e.g., pools 521A and 521B), which are currently idle or available (e.g., pool 525) and so on.

In some embodiments, the status of a requested resource in the spot-price mode may be provided. In various embodiments, such a status may be referred to as a bid status or spot instance status information. By providing additional information to clients, for example, clients may be able to more effectively and advantageously submit spot bids and manage existing spot bid resources. The spot instance status information may include information related to a requested resource such as the status associated with the auctioning process in the workflow of a spot bid request. Some information that may be useful for clients requesting or running spot bid resources may include information regarding why a spot bid request has not been fulfilled, what parameters can be changed to allow a spot bid to be fulfilled more quickly, why a spot bid resource launch has failed, whether and when a spot bid resource will be interrupted, why a spot bid resource was terminated and so on.

In one embodiment, spot instance status information may be provide to clients using an interface provided, for example, by interface manage 582 of FIG. 5. In some embodiments, the spot instance status information may be provided via a programming interface. For example, the stages in a spot instance workflow may be reported to clients via application programming interfaces (APIs) in a status field. At least one of the APIs may be configured to receive electronic messages that encode identifiers indicative of requests for information pertaining to instantiated computing instances and requested additional computing instances. The requests may also include requests for a current status of the instantiated computing instances or requested additional computing resources. In response to receiving one of the electronic messages, an API may send electronic messages indicative of information pertaining to a current status of the one or more of the instantiated computing instances or requested additional computing resources. In one embodiment, a detailed status field may also be provided. Additionally and optionally, a date-time stamp may be provided along with the spot instance status information. The detailed status field may provide additional information such as the bid price required to gain fulfillment. For example, a function may be provided by provider network 510 that provides data such as a bid status code and a bid status message. This spot instance status information may be updated at various intervals. The spot instance status information may be updated at set intervals, or the spot instance status information may be updated when a spot bid's provisioning status changes or is re-evaluated.

The spot instance status information may be machine-readable, human-readable or both. Some examples of possible spot instance status information may include:

pending_evaluation—the spot resource request has been submitted for review and is pending evaluation;

fulfilled—the spot resource request is fulfilled and the requested resources are running;

marked_for_termination—the spot resource is marked for termination because the request price is lower than the fulfillment or current price for the given resource type in the specified availability zone; and price_too_low—the bid is lower than the minimum required fulfillment price.

By providing the spot instance status information, a client may respond with appropriate actions to increase the likelihood that a spot instance request will be fulfilled or actions to increase the likelihood that a current spot instance will not be terminated. The client may also respond with actions to more efficiently manage the workflows that are being executed on the client's spot instances and are designated to be terminated. In one embodiment, a client may request that checkpointing (i.e., generating and storing a snapshot of an application state for later use when the application is restarted) be performed for applications running on a spot instance that will be terminated. Furthermore, by monitoring the spot instance status information, subscriptions to services provided by the provider network can be activated or de-activated as appropriate. Finally, by integrating the spot instance status information with the spot instance life cycle, clients can more effectively resume from failure or setup once a bid is asynchronously created.

In some embodiments, the spot instance status information can be used to more efficiently launch spot instances once the request has been fulfilled. For example, one service that can be provided by a provider network are resource instance templates that can provide a scalable and repeatable ways to create a collection of related spot instances and provision them in an orderly and predictable fashion. By using such templates, an entire architecture can be set up once one or more spot instances have launched.

The spot instance status information can be provided using a number of notification methods. For example, notifications can be pushed to a client by using messaging mechanisms such as e-mail messaging. Notifications can also be provided using programmatic methods such as providing data via a programming interface.

In some embodiments, the spot instance status information can be used to more efficiently start up services when starting a spot instance or disconnect/terminate services when a spot instance is terminated. For example, a client may be subscribed to a load balancing service that automatically distributes incoming application traffic across multiple instances. When a spot instance is to be terminated, this status information can be provided to the client and the client can be proactively unsubscribed from the load balancing service, thereby not taking up any unnecessary data traffic and allowing the service be terminated gracefully.

Additionally, in many cases clients may provide applications on spot instances that are used by third-party users of the applications. If a spot instance is unexpectedly stopped, the third-party user may have a bad experience through data loss or due to an interruption of service when the applications running on the spot instance are terminated and must be transferred to another resource. Although a client may continually poll status information to better anticipate loss of a spot instance, such polling can be time consuming and may not provide timely information.

If the spot instance status information indicates that a spot instance will be terminated because the market-based price level will exceed the current price rate paid by the client, then the client may decide to increase the price rate in order to avoid termination of the spot instance. The ability to timely receive such information can be useful to allow clients to manage instances and ensure that the client has sufficient resources to maintain their computing objectives.

In some embodiments, the spot instance status information can be used to more efficiently manage workflows. For example, workflows may typically involve a number of tasks distributed across multiple systems, and a workflow manager may be implemented that implements workflow management tasks to manage and coordinate workflow parameters such as task execution dependencies, scheduling and concurrency. By using the spot instance status information, the workflow manager can account for new spot instances that are about to come online or account for spot instances that are about to be terminated. A workflow manager can consider a number of factors in managing workflows based on the spot instance status information. For example, a deadline for a project can be accommodated by adjusting workflows using the spot instance status information by, for example, starting an on-demand instance if there are not enough spot instances coming online or stopping a spot instance if there is overcapacity for a given objective.

As another example, a client can more efficiently manage computing costs. If the spot price goes too high, then the client can take an action to shut down services in an orderly fashion in anticipation of terminated spot instances.

A client can take into consideration the impact of potential interruptions, price based scheduling and the probability of interruption based on the price data. When the spot instance status information is received, the client can use the information to decide whether to enhance the quality of services provided using potential additional spot instances. For example, if additional computing capacity is anticipated due to an anticipated spot instance, the client can factor in the increased capacity to provide additional services using the anticipated spot instance. Alternatively, if the spot instance status information indicates that a spot instance will be terminated, then certain tasks or services can be offloaded to other computing resources to minimize impact due to the loss of the spot instance.

Thus in various embodiments, spot instance status information can be used to control workflow and more efficiently manage computing resources that have a dynamic nature such is the case with spot instances.

Figure 7:
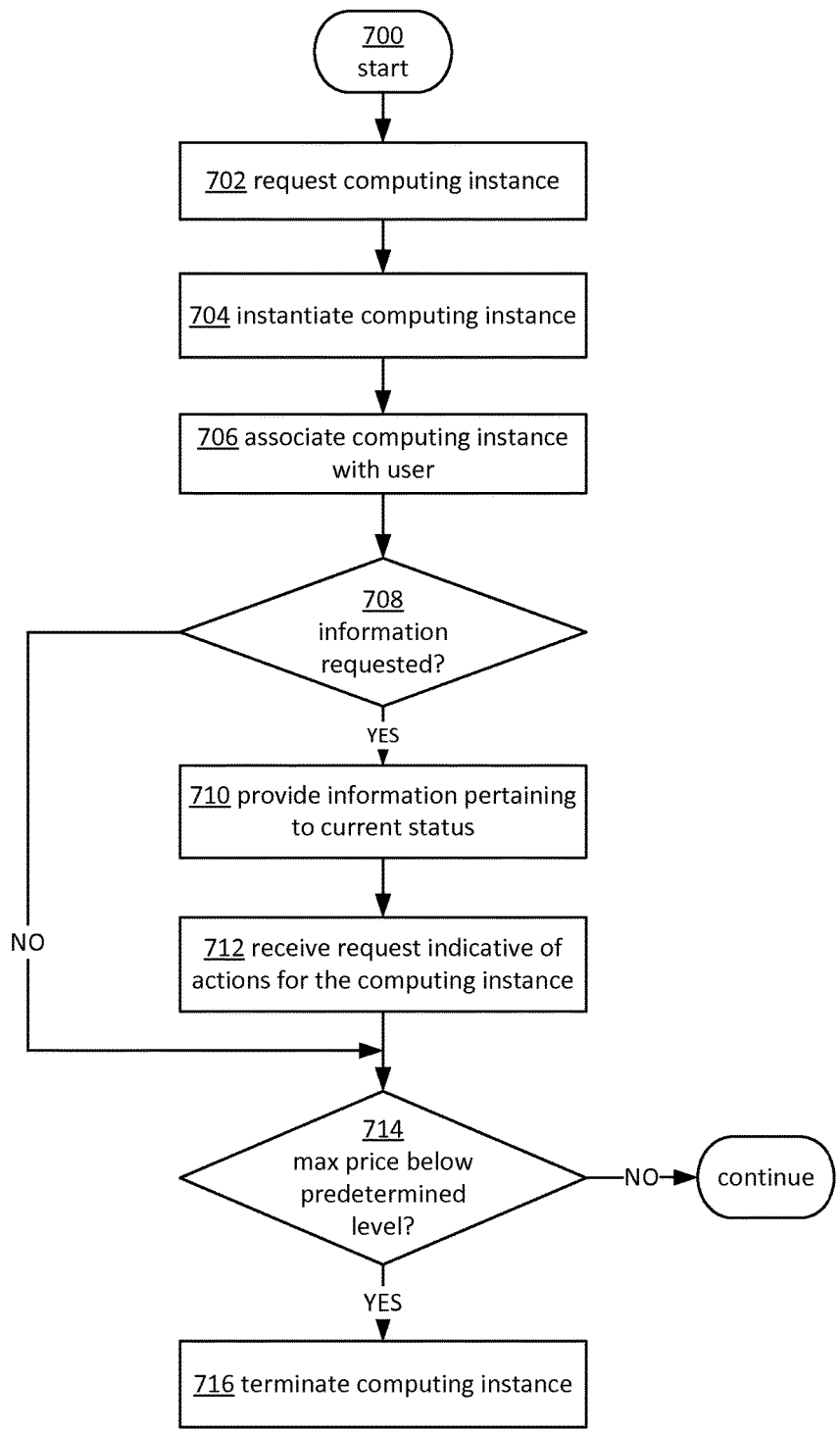
FIG. 7 is a flowchart depicting an example procedure for providing notifications in accordance with the present disclosure.

FIG. 7 illustrates an example operational procedure for providing spot instance status information. In an embodiment, spot instance status information can be provided by services such as an instance management service 180 in FIG. 1. Referring to FIG. 7, operation 700 begins the operational procedure. Operation 700 may be followed by operation 702. Operation 702 illustrates receiving a request for a computing instance. In one embodiment, the requested computing instance can be a spot instance as described herein. Operation 702 may be followed by operation 704. Operation 704 illustrates instantiating the computing instance on a computing device.

Operation 704 may be followed by operation 706. Operation 706 illustrates associating the computing instance with a user while a maximum billing price assigned to the user for the computing instance exceeds a predetermined price level for the computing instance. As discussed above, the predetermined price level can be a dynamic spot price determined at least in part on supply and demand.

Operation 706 may be followed by operation 708. Operation 708 illustrates determining if the user has logged a request for information pertaining to the computing instance. If the user has logged a request for information pertaining to the computing instance, then operation 708 can be followed by operation 710.

Operation 710 illustrates providing information pertaining to a current status of the computing instance including data indicative of a change in the predetermined price level, a potential termination of the computing instance, and when the computing instance will be disassociated from the second user. The information may correspond to the spot instance status information described herein and may be useful to more effectively and advantageously submit spot bids and manage existing spot bid resources. If the user has not logged a request for information pertaining to the computing instance, then operation 708 can be followed by operation 714.

Operation 710 may be followed by operation 712. Operation 712 illustrates receiving, from the first user, one or more requests indicative of actions for the computing instance, wherein the actions are responsive to the current status of the computing instance. As described above, a client may respond with actions to more efficiently manage workflows that are being executed on the client's spot instances and that are designated to be terminated.

Operation 712 may be followed by operation 714. Operation 714 illustrates determining if the predetermined price level rises above the maximum billing price. If the predetermined price level rises above the maximum billing price, then operation 714 may be followed by operation 716 which illustrates terminating the computing instance.

Figure 8:
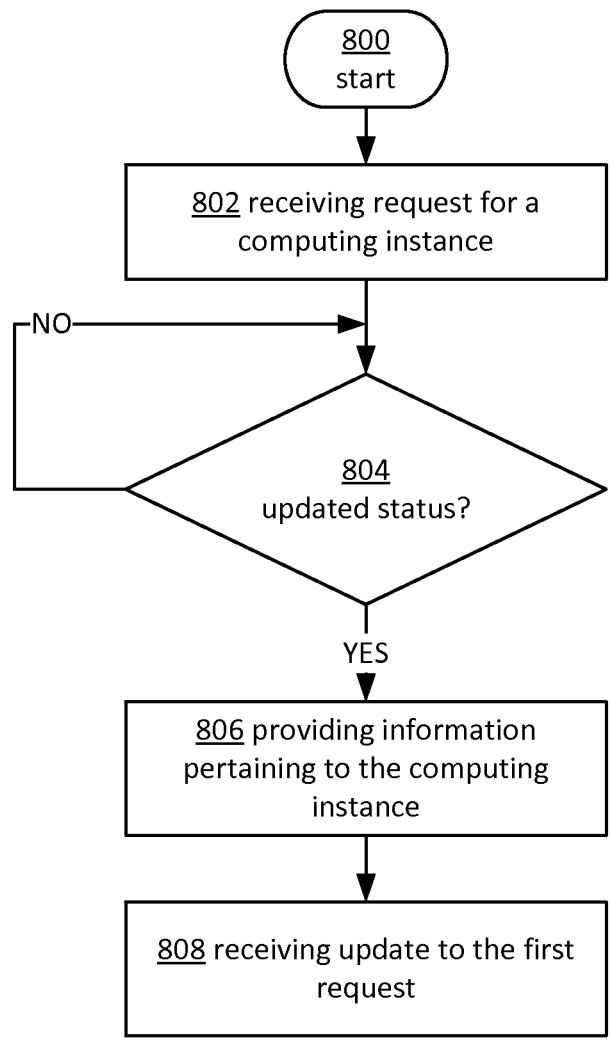
FIG. 8 is a flowchart depicting an example procedure for providing notifications in accordance with the present disclosure.

FIG. 8 illustrates an example operational procedure for providing spot instance status information. In an embodiment, spot instance status information can be provided by service such as an instance management service 180 in FIG. 1. Referring to FIG. 8, operation 800 begins the operational procedure. Operation 800 may be followed by operation 802. Operation 802 illustrates receiving, from a customer, a request for a computing instance. In an embodiment, the request may be based on a maximum price rate for the computing instance. Additionally, the computing instance may be interruptible based on whether the maximum price rate is above a predetermined price rate.

Operation 802 may be followed by operation 804. Operation 804 illustrates determining if the status of the request has been updated. In some embodiments, the status can be updated on a periodic base. In other embodiments, the status can be updated when a state of a request or a spot instance has been changed as illustrated in FIG. 4. If the status has been updated, then operation 804 may be followed by operation 806 which illustrates providing, to the customer, information pertaining to the computing instance. In an embodiment, the information may include a current status of the request and data indicating if or when the computing instance will be allocated to the customer.

Operation 806 may be followed by operation 808. Operation 808 illustrates receiving, from the customer, one or more updates to the request responsive to the information.

Figure 9:
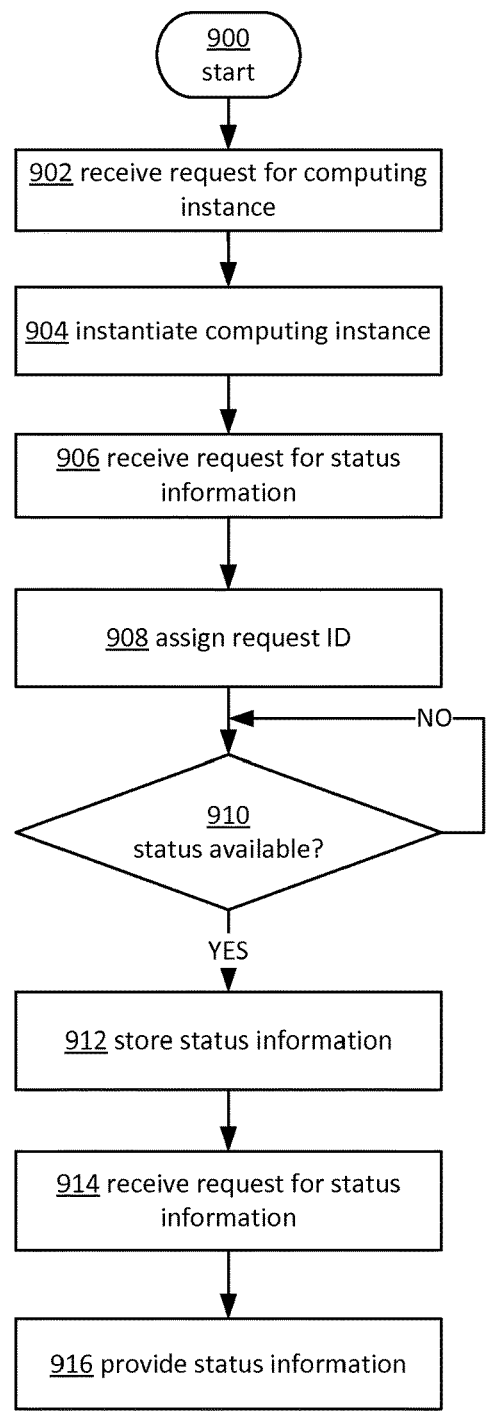
FIG. 9 is a flowchart depicting an example procedure for providing notifications in accordance with the present disclosure.

FIG. 9 illustrates an example operational procedure for providing spot instance status information. In an embodiment, spot instance status information can be provided by services such as an instance management service 180 in FIG. 1. Referring to FIG. 9, operation 900 begins the operational procedure. Operation 900 may be followed by operation 902. Operation 902 illustrates receiving a request for a computing instance. In one embodiment, the requested computing instance can be a spot instance as described herein. Operation 902 may be followed by operation 904. Operation 904 illustrates instantiating the computing instance on a computing device.

Operation 904 may be followed by operation 906. Operation 906 illustrates receiving a request for status information. In one embodiment, the information may correspond to the spot instance status information described herein and may be provided by service such as an instance management service 180 in FIG. 1.

Operation 906 may be followed by operation 908. Operation 908 illustrates assigning a request identifier to the request. The request identifier may include information associating the request with the requested computing instance. Operation 908 may be followed by operation 910. Operation 910 illustrates determining if new status information regarding the requested computing instance is available. If new status information regarding the requested computing instance is available, then operation 910 may be followed by operation 912.

Operation 912 illustrates storing information pertaining to a current status of the computing instance including, for example, data indicative of a change in price levels, a potential termination of the computing instance, or when the computing instance may be disassociated from the second user. The information may correspond to the spot instance status information described herein.

Operation 912 may be followed by operation 914. Operation 914 illustrates receiving a request for status information. Operation 914 may be followed by operation 916. Operation 916 illustrates retrieving the status information based on the request ID and providing the status information to the user.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/ cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more computing devices;
   at least one memory having stored therein computer instructions that, upon execution by the one or more computing devices of the system, at least cause the system to:
   instantiate a computing instance on one of the one or more computing devices;
   associate the computing instance with a first user as long as a maximum billing price assigned to the first user for the computing instance exceeds a predetermined price level for the computing instance;
   provide, by an application programming interface, information pertaining to a current status of the computing instance including data indicative of a change in a predetermined price level and a potential termination of the computing instance, wherein the system is configured to continue to provide uninterrupted access to the computing instance to the first user until receiving an indication that the access may be terminated, the indication communicated via the application programming interface;
   receive, by the application programming interface, one or more requests indicative of actions for the computing instance based upon the updated price level, wherein the actions are responsive to the indication that access may be terminated; and
   perform the actions based at least in part on the one or more requests, wherein prior to the user's instance being terminated, at least one of the actions comprises storing in a storage medium a snapshot of the state of the computing instance for later use when the received request indicates that access will be terminated.

2. The system according to claim 1, wherein the one or more requests comprise a request to perform checkpointing.

3. The system according to claim 1, wherein the one or more requests comprise a request to unsubscribe to a service provided by the system.

4. The system according to claim 1, wherein the information pertaining to the current status provided by the application programming interface (API).

5. The system according to claim 1, wherein the one or more requests comprise a request to convert the computing instance to a reserved or on-demand instance.

6. A method for providing computing resources comprising a computing instance by a provider network, the method comprising:
   in a computing environment comprising a plurality of computing devices providing the computing resources, instantiate the computing instance on one of the plurality of computing devices;
   receiving, a request to provide access to the computing instance, the request based on a maximum price rate for the computing instance and wherein the computing instance is uninterrupted by the maximum price rate being above a predetermined price rate;
   providing, by the application programming interface, information pertaining to a current status of the computing instance including data indicative of a change in a predetermined price rate and a potential termination of the computing instance, wherein the system is configured to continue to provide uninterrupted access to the computing instance to the first user until receiving an indication that the access may be terminated, the indication communicated via the application programming interface; and
   receiving, by the application programming interface, information indicative of at least one action to perform responsive to the information;
   performing the at least one action; and
   terminating the computing instance based on receiving an indication, based on the current status, that the access to the computing instance may be terminated, wherein prior to the computing instance being terminated, at least one of the actions comprises storing in a storage medium a snapshot of the state of the computing instance for later use when the received request indicates that access will be terminated.

7. The method of claim 6, wherein the providing comprises providing the application programming interface (API).

8. The method of claim 6, wherein the one or more updates comprise a request to configure the computing instance according to a template defined by the customer.

9. The method of claim 6, wherein the one or more updates comprise an update to the maximum price rate.

10. The method of claim 9, wherein the providing comprises sending a message to a user of the computing instance.

11. The method of claim 6, wherein the one or more requests comprise a request to load data from a previous checkpointing process.

12. The method of claim 6, wherein the one or more updates comprise a request to subscribe to a load balancing service.

13. The method of claim 6, wherein the one or more updates comprise a request to perform one or more workflow management tasks when the computing instance is instantiated.

14. The method of claim 13, wherein the one or more workflow tasks are determined based on workflows scheduled for performance on other instantiated computing instances.

15. The method of claim 6, wherein the information is updated in response to a change in the current status of the request.

16. The method of claim 6, further comprising assigning a request identifier associated with the request and associating the information with the request identifier.

17. The method of claim 16, further comprising storing the information pertaining to the requested computing instance and the request identifier for subsequent retrieval.

18. A non-transitory computer-readable storage medium having stored thereon computer-readable instructions, the computer-readable instructions comprising instructions that upon execution on one or more computing devices, at least cause:
- instantiating a plurality of computing instances allocated to a plurality of customers, wherein the plurality of computing instances have a modifiable interruptibility property operable to allow a computing instance to be terminated or reallocated from a first customer to a second customer;
- receiving requests for additional computing instances having modifiable interruptibility properties; and
- providing information pertaining to the instantiated computing instances and requested additional computing instances including a current status of one or more of the instantiated computing instances or requested additional computing resources;
- receiving a request to perform an action on at least one of the instantiated computing instances and requested additional computing instances; and
- perform the action based at least in part on the request; and
- interrupting the computing instance based on receiving an indication, based on the current status, that the computing instance may be interrupted, wherein prior to the user's instance being interrupted, at least one of the actions comprises storing in a storage medium a snapshot of the state of the at least one of computing instances for later use when the received request indicates that access will be interrupted.

19. The non-transitory computer-readable medium of claim 18 wherein an instantiated computing resource with a modifiable interruptibility property is terminated based on a market-based price level.

20. The non-transitory computer-readable medium of claim 18, further comprising computer-readable instructions comprising instructions that upon execution on the one or more computing devices, at least cause receiving one or more requests indicative of actions for one or more of the instantiated computing instances.

21. The non-transitory computer-readable medium of claim 18, further comprising computer-readable instructions comprising instructions that upon execution on the one or more computing devices, at least cause receiving one or more requests indicative of one or more updates to the requested additional computing resources.

22. The non-transitory computer-readable medium of claim 18, wherein the information comprises a current status of a requested additional computing resource and data indicating if or when the requested additional computing instance will be allocated.

23. One or more non-transitory computer-readable storage media having collectively stored thereon executable instructions that, when executed by one or more processors of a computer system, cause the computer system to at least implement:
- a programming interface sub-system configured to:
  - receive first electronic messages that encode identifiers indicative of requests for information pertaining to instantiated computing instances and requested additional computing instances including a current status of one or more of the instantiated computing instances and requested additional computing resources;
  - in response to receiving one of the electronic messages, sending second electronic messages indicative of information pertaining to a current status of the one or more of the instantiated computing instances and requested additional computing resources;
  - receive a request to perform an action on at least one of the one or more of the instantiated computing instances and requested additional computing resources;
  - perform the action based at least in part on the request to provide uninterruptible access to the one or more instantiated computing instances and requested additional computing resources; and
  - prior to the user's instance being terminated, storing in a storage medium a snapshot of the state of at least one of the instantiated computing instances for later use when the received request indicates that access will be terminated.

* * * * *